United States Patent [19]

Dellinger et al.

[11] Patent Number: 4,647,725
[45] Date of Patent: * Mar. 3, 1987

[54] INDOOR TYPE TELEPHONE NETWORK INTERFACE DEVICE

[75] Inventors: Thomas A. Dellinger, North Richland Hills; Clifton G. Hampton, Bedford, both of Tex.

[73] Assignee: Siecor Corporation, Hickory, N.C.

[*] Notice: The portion of the term of this patent subsequent to Dec. 11, 2001 has been disclaimed.

[21] Appl. No.: 710,451

[22] Filed: Mar. 11, 1985

[51] Int. Cl.⁴ .................. H04M 1/24; H04M 9/00
[52] U.S. Cl. .................. 329/29; 339/125 R; 339/126 R; 329/19; 329/399; 329/417
[58] Field of Search .................. 179/178, 179, 146 R; 339/125 R, 126 R, 154 A, 176 M

[56] References Cited

U.S. PATENT DOCUMENTS 4,488,008 12/1984 Dellinger et al. .................. 179/179
4,560,839 12/1985 Dillard .................. 179/179

Primary Examiner—Gene Z. Rubinson
Assistant Examiner—Danita R. Byrd
Attorney, Agent, or Firm—Roy B. Moffitt

[57] ABSTRACT

A telephone network interface device adapted for limited access by telephone subscribers comprising a base on which there is a first and second set of terminals, the first set of terminals are adapted to be connected to the portion of a telephone subscriber loop not owned by the subscriber and the second set of terminals are adapted to be connected to the subscribers' premise wiring; a first jack (a first dielectric carrier and jack top housing), the first dielectric carrier having electrical contacts adapted to be mechanically and electrically engaged and disengaged with a plug; a second jack (a second dielectric carrier and jack top housing) and a plug both the plug and second dielectric carrier having electrical contacts therein adapted to be mechanically and electrically engaged and disengaged with one another; an electrical conductor electrically connecting the plug to the second set of terminals, an electrical conductor electrically connecting the first dielectric carrier to the second set of terminals, and an electrical conductor connecting the second dielectric carrier to the first set of terminals; a wall disposed between the first and second set of terminals; and, a shield covering the first but not the second set of terminals. A portion of the base is removably engaged, the removable portion containing affixed thereto the second set of terminals, the electrical conductor connecting the first dielectric carrier to the second set of terminals, the plug and the electrical conductor connecting the plug to the second set of terminals.

10 Claims, 7 Drawing Figures

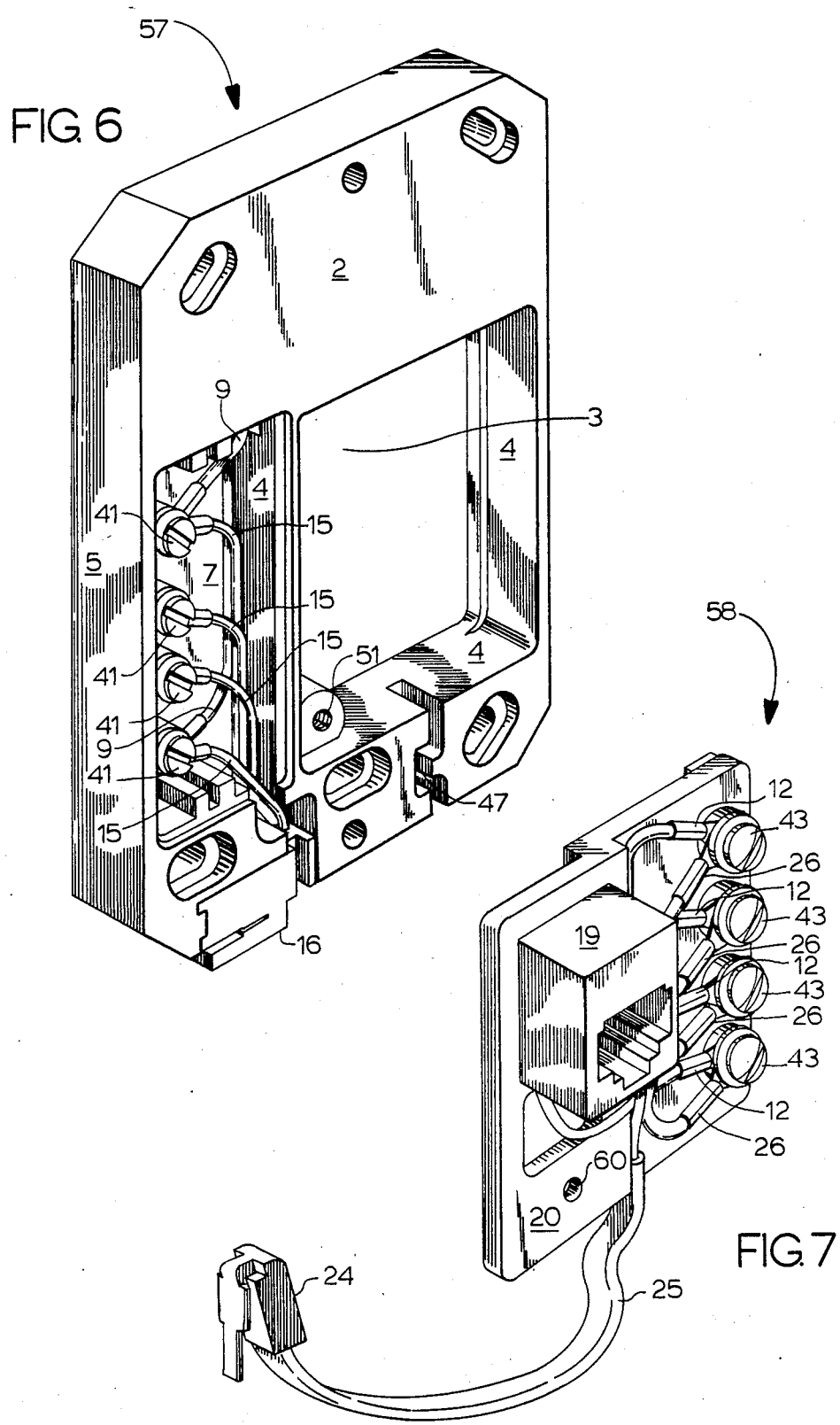

INDOOR TYPE TELEPHONE NETWORK INTERFACE DEVICE

BACKGROUND OF THE INVENTION

This invention has a common background with the invention disclosed in U.S. Pat. No. 4,488,008. With the advent of deregulation of the telephone system in the United States, many conceptual changes have been required or are yet to be required in both equipment and services, not at least which is the identity of the party responsible for repair and maintenance between subscriber premise and telephone company owned telephone equipment. A telephone subscriber, for instance, may now own his own telephones, premise wiring, PABX's, and other associated equipment, the maintenance of which is sole responsibility. It is in this context where the invention is most useful.

Recent rulings by the FCC require that a device be installed on the premises (either inside or outside the premises) of each subscriber that will permit testing of the integrity of that part of the subscriber loop owned by the telephone company. The rationale behind this rule is to provide a means whereby a subscriber may avoid a telephone service charge by the telephone company arising out of a subscriber complaint regarding faulty telephone services in those instances were the faulty service is in that portion of the subscriber loop belonging to the telephone company.

By use of this invention, either a subscriber and/or a telephone service person may easily unplug from a jack a previously connected plug, insert another plug connected to an operating telephone into the jack and if a call can be made using such an arrangement, that portion of the subscriber loop owned by the telephone company is without fault and the fault thus must be in the subscriber premise wiring or the equipment of the subscriber. A telephone subscriber may perform this testing function for himself and thus identify between his premise wiring (owned by him) and the subscriber loop (owned by the telephone company) where the fault lies and who is responsible for fixing it.

The invention is a network interface device designed and adapted to be connected to the non-telephone company owned premise wiring and the telephone company owned portion of the subscriber loop at the junction where the two connect one to another and is designed for inside owner premises applications.

The device, mechanically and electrically, connects the premise wiring to the non-premise wiring and provides a quick disconnect and connect means there between, namely a plug and jack. The plug is mechanically and electrically engaged to the jack, thus forming an electical circuit between a subscriber owned premise wiring equipment and the telephone owned portion of a subscriber loop. Removal of the plug from the jack disconnects the two and provides a jack into which a plug, connected to an operating telephone, may be inserted. If there is no fault in the telephone owned subscriber loop portion, dial tone will be heard and a call may be made, thus indicating that any fault must be in the subscriber owned premise wiring and/or equipment. Absence of dial tone and a completed call indicates the reverse, i.e., there is a fault in the telephone owned portion of the subscriber loop. In addition, the device contains a second jack (a customer jack), which provides a means for connecting one or more telephones.

BRIEF SUMMARY OF THE INVENTION

The herein disclosed telephone network interface device is an improvement over known prior art telephone network devices. It contains first and second set of terminals, the first set of terminals being adapted to be connected to a portion of the telephone subscriber loop that is not owned by the subscriber, and the second set of terminals is adapted to be connected to the subscriber's premise wiring. The device contains a first dielectric carrier and jack top housing (a first jack), the dielectric carrier having electrical contacts adapted to be mechanically and electrically engaged and disengaged with a plug, e.g., one connected to an operating telephone. The device also contains a second dielectric carrier, which is surrounded by a jack top housing forming a second jack, and a plug. An electrical conductor connects the plug to the second set of terminals and another electrical conductor connects the first dielectric carrier to the second set of terminals. In addition, there is an electrical conductor that electrically connects the second dielectric carrier to the first set of terminals. A wall means is disposed between the first and second set of terminals in combination with a shield that covers the first but not the second set of terminals.

The above mentioned components of the instant invention are positioned on a base that contains an aperture. A portion of the base is removably engaged to the base within the aperture, the removable component containing affixed thereon the first jack (jack top housing and the first dielectric carrier), the second set of terminals, the electrical conductors connecting the first dielectrical carrier to the second set of terminals and the electrical conductor and plug connecting the plug to the second set of terminals.

The subscriber's terminals (sometimes referred to herein as the subscriber's entrance bridge) and first jack (first dielectric carrier and jack top housing combination) are located on the removable component. This component is removable for four reasons: (1) A physical separation between the telephone company owned hardware can be established with the removable component. The telephone company can install the base unit without the customer's terminal and first jack and in some states, if approved by the Public Utilities Commission, charge the customer for the component plus labor if installed. (2) The subscriber's entrance bridge can be replaced by the subscriber if damaged. (3) For mounting to an outlet box, the telephone company can remove the subscriber's entrance bridge to make installation easier. (4) The subscriber can remove the subscriber's entrance bridge to gain access to the outlet box for "fishing" wiring through a wall without removing the indoor telephone network interface device from the wall. This feature satisfies the desire of the telephone company that a customer not dismount the unit from the wall once it has been installed.

BRIEF DESCRIPTION OF THE DRAWINGS

FIG. 6 is a perspective view of the base of the indoor telephone network device with the removable insert component containing the first jack top, terminals, electrical conductors and plug removed.

FIG. 7 is a perspective view of the removable component containing the first jack top, terminals, electrical conductors and plug.

DETAILED DESCRIPTION OF THE INVENTION

Figure 1:
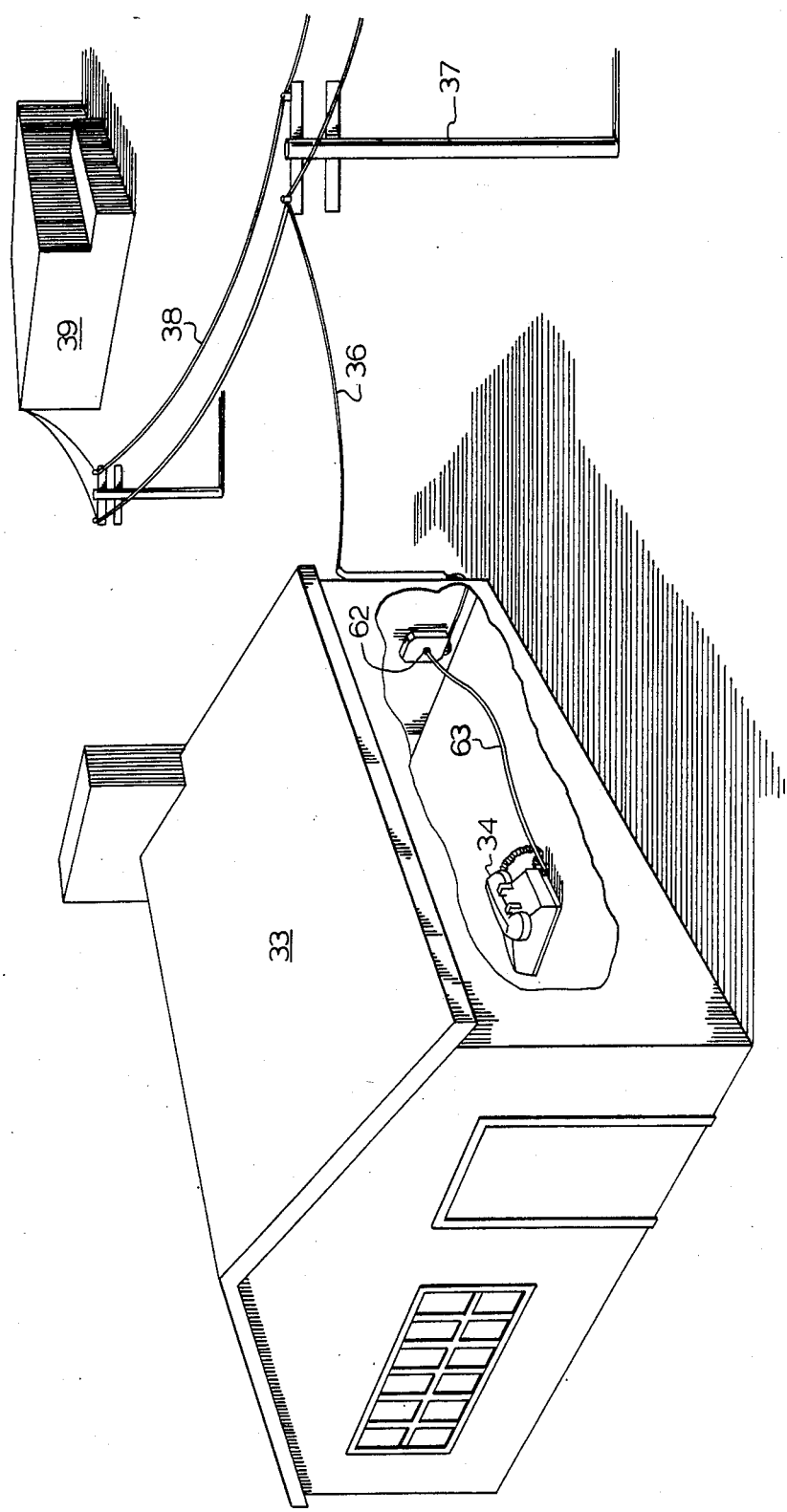
FIG. 1 is a diagramatic partially cutaway sketch of subscriber's premises and telephone company owned scriber loop.

FIG. 1 is a diagramatic sketch of a telephone subscriber's premises 33 and the telephone company owned subscriber loop; i.e., that portion of the telephone circuit from the central office 39 over cable 38, to telephone pole 37, to drop wire 36 into the subscriber's premises 33. Drop wire 36, terminates inside the subscriber's premise at the telephone network interface device 1.

For a subscriber to test the subscriber loop, he only needs to disengage plug 24 (FIG. 2) from its jack 16 by removing it from cavity 17. Such removal, removes plug 24 from the tangs (not shown) of a dielectric carrier 50 (like that of element 11), integrally affixed to jack 16. Assuming he has an operable telephone handset, the subscriber may now test the subscriber loop, that portion of the telephone circuit from the telephone network interface 1 to the central office 39. Into cavity 17 (of jack top 16) he inserts a plug 62 like that of plug 24 connected to his operable telephone handset 34. If the telephone line from the telephone network interface to the central office is operable, the subscriber will hear a dial tone and will be able to dial out to reach another party. If not, then he has ascertained that the telephone company has fault in their part of the loop, which they are required to fix without a service charge to him. If otherwise, the expected trouble lies within the subscriber's premise wiring, and the subscriber is responsible for the repair.

Figure 2:
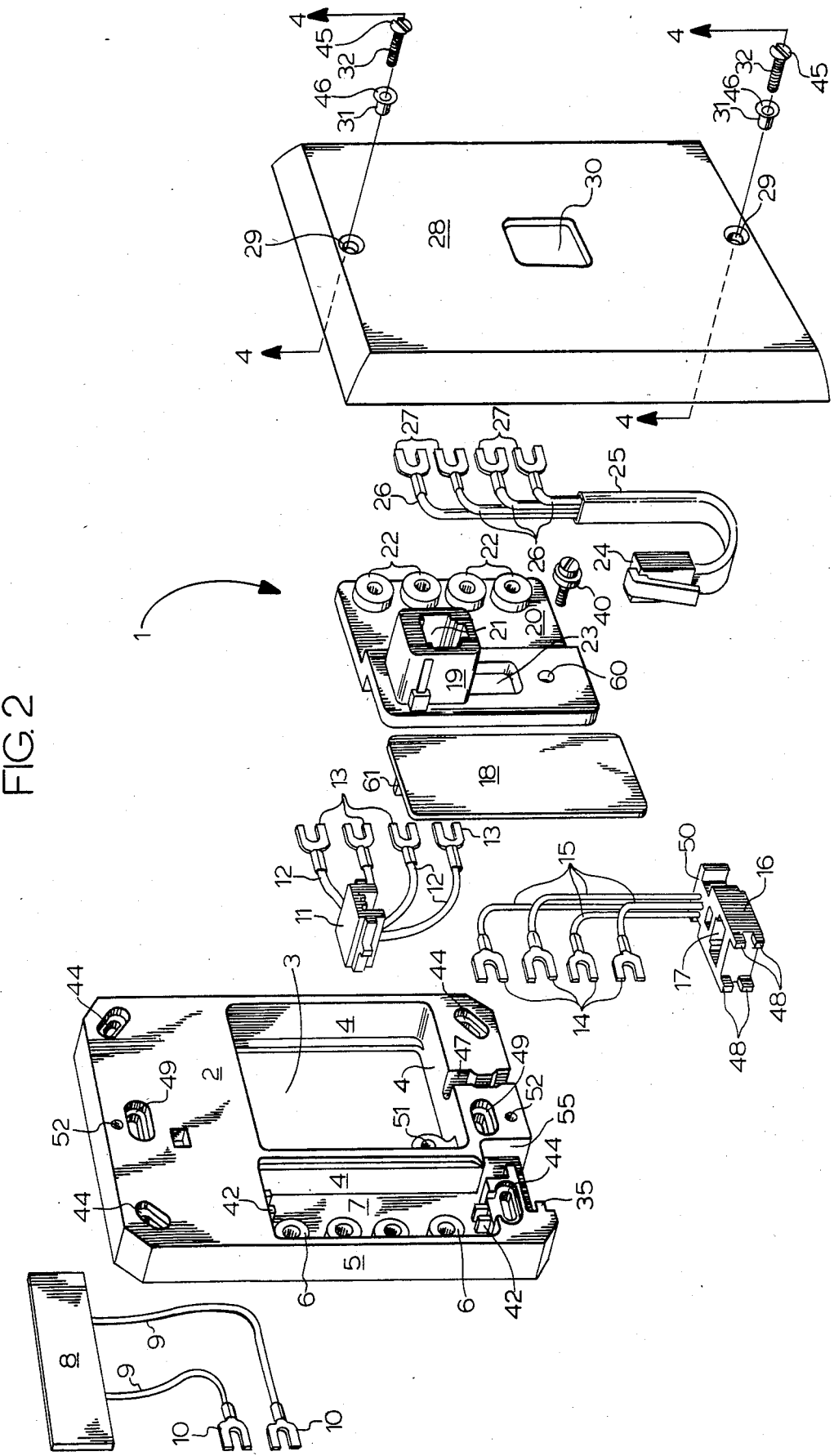
FIG. 2 is an exploded isometric perspective view of the various parts of the indoor type telephone network interface device showing how such parts may be assembled.
Figure 3:
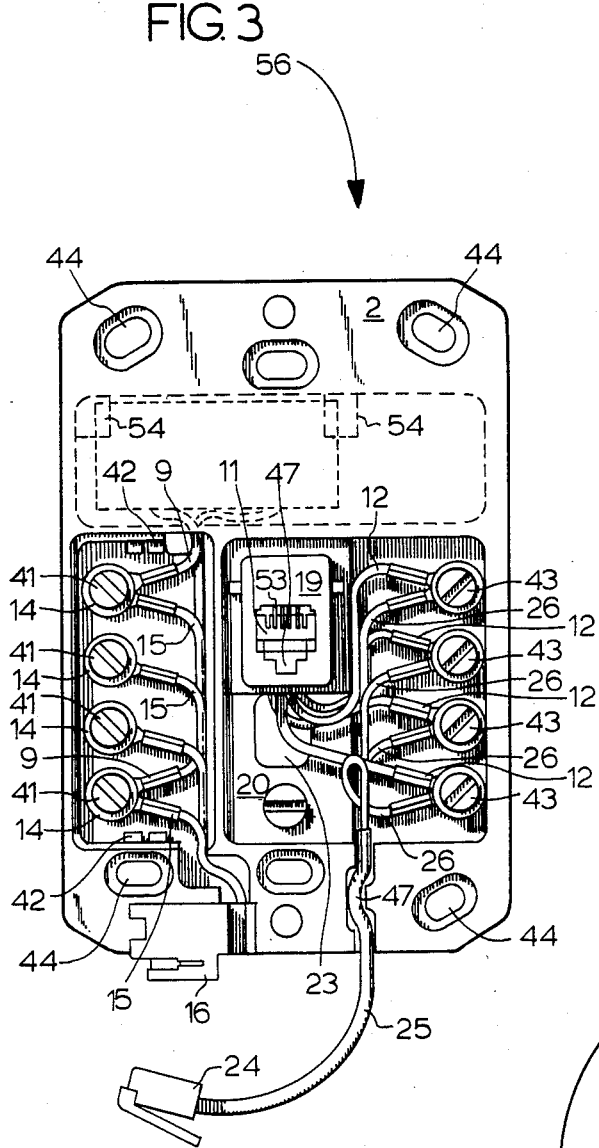
FIG. 3 is a side elevation of the indoor telephone network device, absent shield 18 and cover 28.
Figure 4:
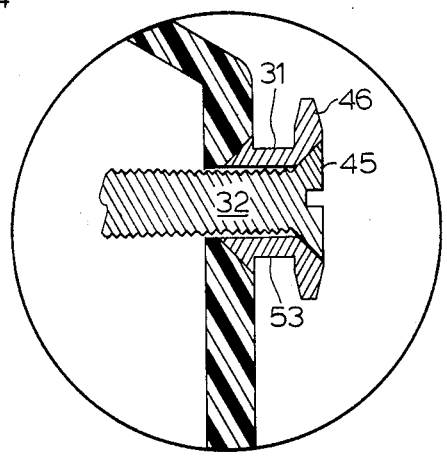
FIG. 4 is an enlarged cross sectional view along line 4—4 of FIG. 2.
Figure 5:
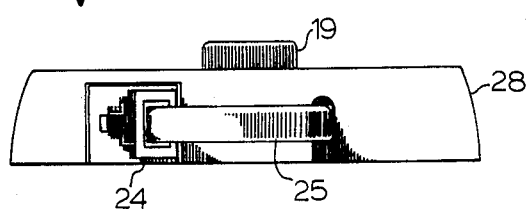
FIG. 5 is a side elevation view of the assembled indoor telephone network interface device of FIG. 2.

Turning now to FIG. 2, there is shown by element 1 an exploded unassembled indoor telephone network interface device. This device contains a base 2 which has aperture 3 and adjacent to the aperture a cavity 7 is formed by sidewalls 4 and 5. Aperture 3 is circumscribed by sidewalls 4. In cavity 7 is a plurality of receiving means 6, adapted to receive terminals 41 (FIG. 3). Attached to one of the sidewalls 4 of cavity 3 is a protrusion 51, adapted to receive screw means 40, used to affix removable component 20 to base 2 by inserting screw 40 through aperture 60 of base 20 and affixing screw 40 into receiving means 51. Cavity 7 contains at its extremities two pairs of upstanding spaced apart protrusions 42 opposing one another, adapted to receive between each pair protrusions 61 of shield 18 and thereby removably affixing shield 18 to base 2 and over cavity 7. Base 2 also contains a plurality of apertures 44, which are used to affix element 1 to a wall or any other base. Element 8 is either a ringer, a half-ringer or a protector device, the structural details of which are described in U.S. Pat. No. 4,488,008, the contents of which are hereby incorporated by reference if such had been faithfully reproduced. Element 8 is attached to terminals 41 and receiving means 6 by insulating electrical conductors 9 and spades 10. In the lower left-hand corner of base 2, there is a protrusion 35, adapted to fit in between the two laterally protruding spaced apart protrusions 48 of jack 16 for removably affixing jack 16 in that cavity formed and circumscribed by wall 55 of base 2, by a sliding jack 16 over protrusion 35 and fitting such protrusion in between the upstanding laterally protruding spaced apart members 48 of jack 16.

To the right of base 2 are first and second dielectric carriers 11 and 50 respectively. First dielectric carrier 11 is associated with jack top housing 19 (to form a first jack) as a removable component thereof, whereas the second dielectric carrier 50 is integrally molded to the jack top housing (jack 16). For the structural details of a jack top housing and a dielectric carrier (jack), specific reference is made to U.S. Pat. No. 4,146,292 as well as U.S. Pat. No. 3,990,764, the contents of which are herein incorporated by reference as if they were faithfully reproduced. Dielectric carrier 50 of jack top housing 16 contains a plurality of tangs (not shown, but see element 53 of FIG. 3) that are exposed in cavity 17, adapted to be in electrical and mechanical contact with contacts (not shown) on the reverse side of plug 24, once plug 24 is inserted into cavity 17. Tangs (not shown) of dielectric carrier 50 are in electrical communication with the electrical conductors 15, making an electrical circuit made from plug 24 to the tangs of dielectrical carrier 50, to the electrical conductors 15 to spades 14, to terminals 41, the first set of terminals. Of course plug 24, through electrical conductors 26 and spades 27 is in electrical communication with terminals 43. Terminals 41 are adapted to be connected to the telephone company owned portion of the subscriber loop. At this juncture it will be noted that there are first set of terminals 41 and a second set of terminals 43. Terminals 43 are adapted to be received in receiving means 22 disposed on removable base portion 20.

Dielectric carrier 11, which also has tangs 53 (FIG. 3), is removably affixed inside of jack top housing 19. Tangs 53 of dielectric carrier 11 are in electrical communication with electrical conductors 12 and spades 13, which are in electrical and mechanical communication with terminals 43, disposed in receiving means 22 affixed to removable base component 20.

Plug 62 (like that of plug 24), attached to telephone handset 34 line cord 63 is adapted to be inserted into cavity 21. By so doing, a circuit is made from telephone handset 34, line cord 63, tangs 53, electrical conductors 12, spades 13, terminals 43, spades 27, electrical conductors 26, plug 24, tangs of dielectric carrier 50, electrical conductors 15, spades 14, terminals 41 and thence to the subscriber loop (elements 36 and 39). Removal of plug 24 from cavity 17 breaks this circuit and permits insertion of plug 62 into cavity 17, thus completing a circuit in the manner previously described. Such begins the testing procedure. If dial tone is heard and dialing out is achieved, this proves the functioning of the telephone company owned subscriber loop.

Removable base component 20, as previously described, is removably affixed to base 2 by inserting element 20 into aperture 3 and removably affixing element 20 to element 2 by means of screw means 40 through aperture 60 and into receiving means 51.

Plug 24 has on its reversed side a plurality of electrical contacts (not shown), which are in electrical communication with electrical conductors 26. For details of the plug contemplated by this invention see U.S. Pat. No. 3,761,869, the contents of which are herein incorporated by reference as if faithfully reproduced. Electrical conductors 26, circumscribed by a jacket 25, are in electrical communication with spades 27, adapted to be connected to terminals 43, which in turn are adapted to be received into receiving means 22 on removable base component 20. Plug 24 is adapted to be inserted into cavity 17 of jack 16 where its electrical contacts (not shown) come into electrical and mechanical contact and communication with the tangs of second dielectric carrier 50, via conductors 26 and 15 form an electrical path from terminals 43 (the subscriber terminals) to terminals 41 (the telephone company terminals). It will be noted that the telephone company terminals 41 are covered by shield 18 and unaccessible to the subscriber whereas the subscriber terminals 43 are covered only by shield 28, easily removed by removing stud-screw means 46-32, adapted to be received into aperture 29 and receiving means 52 of base 2.

Shield means 28 contains aperture 30 adapted to circumscribe jack top housing 19. Futhermore, shield 28 contains stud-screw means 45-32, adapted not only to affix shield 28 to base 2 but also to support a wall type telephone.

Wall type telephones generally will contain a plug like means attached to its base adapted to fit into cavity 21 of jack top housing 19. This plug type device will be similar in construction to plug 24 and have contacts thereon adapted to come into electrical and mechanical contact with the tangs 53 of dielectric carrier 11. The wall type telephone (unshown) generally will have upper and lower apertures in its base adapted to fit over and to be removably affixed to the stud-screw 46-32. The base portion of the wall type telephone (unshown) fits into that space denoted as 53, such being the space between the enlarged head 46 of stud-screw 45-32 and the outermost surface of shield 28. Groove 47 connects aperture 3 with the bottom most free edge of base 2 so that electrical conductors 26 circumscribed by jacket 25 can be inserted therein in a workman like manner and acts as a strain relief.

Shown in FIG. 3 is composite 56 comprising base 2 and removable component 20, containing jack top housing 19 with dielectric carrier 11 inserted therein exposing, tangs 53 of dielectric carrier 11. Element 56 is shown without shield 18 and cover 28 and depicts first and second sets of terminals elements 41 and 43 repectively. Element 56 also shows, by dotted lines, a cavity in the rear portion of base 2 and two protrusions 54 spaced apart (not shown) from the back surface of the cavity, which may be used to mechanically receive and removably affix element 8 in the cavity. Element 56 also shows spades 14 in electrical and mechanical engagement with terminals 41 (the telephone company's entrance bridge) and spades 13 and 27 in electrical and mechanical communication with terminals 43 (the telephone subscriber's entrance bridge). Jack top housing 16 and its integrally affixed dielectrical carrier 50 are slideably engaged via protrusions 35 and 48 in the cavity defined by wall means 55. Element 56 also shows electrical conductors 9 of element 8 connected to certain terminals 41 by spades 10.

Reference is now made to FIGS. 6 and 7 (elements 57 and 58) where removable base component 20, element 58 (shown affixed to base 2 in FIG. 3) is physically removed from base 20. Element 57 can be installed on a subscriber's premises per se, with shield 18 and cover 28 thereby providing a basic telephone interface device. With such a device per se, if a customer were suspicious of trouble with his telephone lines and did not know whether or not trouble was with his own premise wiring or with the telephone company owned loop, he could remove a telephone plug like that of element 62 from jack to which it was originally connected, inserted it into cavity 17 of jack top housing. If there was a dial tone and he was able to dial and connect another party, he would then know that the problem was with his own premise wiring. If he was unable to do so, then the trouble in his telephone line would be with the telephone loop of the telephone company. Later on, if desired, element 58 can be added to the telephone network interface device 57 by removing cover 28, and affixing element 58 to element 57 by means of aperture 60, screw 40 and receiving means 51.

Aperture 3 in element 57 creates a space that is rather handy to the telephone repairman. For example, he can fish wires through it and make other mechanical and electrical arrangements that he could not otherwise do if base component 20 of element 58 were permanently affixed to base 2 of element 57. This combination also provides a physical separation between telephone owned hardware and subscriber owned hardware with a removable component 58.

A review of the above description readily discloses a telephone interface network device adapted for limited access by telephone subscribers and complete access by telephone company's employees having a base containing: first 41 and second 43 set of terminals; the first set of terminals 41 adapted to be connected to that portion of a telephone subscriber loop not owned by the subscriber and the second set of terminals 43 adapted to be connected to the subscriber's premise wiring; a first dielectric carrier 11 having electrical contacts therein adapted to be mechanically and electrically engaged and disengaged with a plug; a second dielectric carrier 50 and a plug 24, both plug 24 and dielectric carrier 50 having electrical contacts therein adapted to be mechanically and electrically engaged with one another; a means 26 and 27 electrically connecting plug 24 to the second set of terminals 43; a means 12 and 13 electrically connecting the first dielectric carrier 11 to the second set of terminals 43; a means 14 and 15 electrically connecting the second dielectric carrier 50 to the first set of terminals 41; wall means 4 disposed between the first set of terminals 41 and the second set of terminals 43; and, a shield means 18 covering the first set of terminals 41 but not the second set of terminals 43.

What is claimed is:

1. A telephone network interface device adapted for limited access by telephone subscribers and complete access by telephone company employees comprising a base on which there is:
   (a) first and second set of terminals, said first set of terminals adapted to be connected to that portion of a telephone subscriber loop not owned by the subscriber and said second set of terminals being adapted to be connected to the subscriber's premise wiring;
   (b) a first dielectric carrier having electrical contacts therein;
   (c) a second dielectric carrier and plug both the plug and second dielectric carrier having electrical contacts therein;
   (d) means electrically connecting the plug to the second set of terminals, means electrically connecting the first dielectric carrier to the second set of terminals, and means electrically connecting the second dielectric carrier to the first set of terminals;

(e) a wall means disposed between said first and second set of terminals; and, (f) a shield means covering the first but not the second set of terminals.

2. The telephone network interface device of claim 1 including a jack housing circumscribing the first dielectric carrier.

3. The telephone network interface device of claim 1 including a jack housing circumscribing the second dielectric carrier.

4. The telephone network interface of claim 1 including first and second jack housings circumscribing the first and second dielectric carriers respectively.

5. The telephone network interface device of claim 1 including a cover means having an aperture therein, the cover means adapted to cover and be removably affixed to the base.

6. The telephone network interface device of claim 1 including a ringer means electrically connected to some of the terminals of the first set.

7. The telephone network interface device of claim 1 wherein the means electrically connecting the plug to the second set of terminals is a plurality of electrical conductors, the means electrically connecting first dielectric carrier to the second set of terminals is a plurality of electrical conductors and the means electrically connecting the second dielectric carrier to the first set of terminals is a plurality of electrical conductors.

8. The telephone network interface device of claim 5 wherein the cover is removably affixed to the base by a plurality of studs, the studs having a body and head portion, the head portion (a) having a larger diameter than the body portion and (b) spaced apart from the uppermost surface of the cover.

9. The telephone network interface device of claim 1, wherein the base contains an aperture and further including a removable portion, the removable portion being removably engaged with the base and disposed in the aperture, contains fixed thereon the first dielectric carrier, the second set of terminals, the means electrically connecting the first dielectric carrier to the second set of terminals, and the means electrically connecting the plug to the second set of terminals.

10. The telephone network interface device of claim 9 including a slot communicating with the aperture and one free edge of the base, adapted to receive therin the means electrically connecting the second set of terminals with the plug.

* * * * *